United States Patent [19]

Cowan et al.

[11] 4,441,740
[45] Apr. 10, 1984

[54] CONNECTORS FOR SECURING MEMBERS TOGETHER UNDER LARGE CLAMPING FORCE

[75] Inventors: William S. Cowan; Edward M. Galle, Jr., both of Houston, Tex.

[73] Assignee: Armco Inc., Middletown, Ohio

[21] Appl. No.: 327,445

[22] Filed: Dec. 4, 1981

[51] Int. Cl.³ ..................... F16L 35/00; F16L 55/00
[52] U.S. Cl. ..................... 285/18; 285/315; 285/DIG. 21
[58] Field of Search .............. 285/18, 315, 320, 321, 285/317, DIG. 21; 166/339, 340, 351

[56] References Cited

U.S. PATENT DOCUMENTS

| | | | |
|---|---|---|---|
| 1,825,774 | 10/1931 | Boynton | 285/18 |
| 1,933,935 | 11/1933 | Santiago | 285/22 |
| 2,470,256 | 5/1949 | McIlroy | 285/163 |
| 2,657,904 | 11/1953 | Evenson | 254/104 |
| 2,860,893 | 11/1958 | Clark | 285/163 |
| 2,965,073 | 12/1960 | Alfieri | 121/38 |
| 3,278,158 | 10/1966 | Saldana | 254/106 |
| 3,321,217 | 5/1967 | Ahlstone | 285/315 X |
| 3,354,951 | 11/1967 | Savage et al. | 166/0.6 |
| 3,536,344 | 10/1970 | Nelson | 285/315 X |
| 3,643,984 | 2/1972 | Bucceri | 285/382.7 |
| 3,675,713 | 7/1972 | Watkins | 166/340 |
| 3,774,352 | 11/1973 | Weber | 51/238 |
| 3,997,198 | 12/1976 | Linder | 285/98 |
| 4,049,297 | 9/1977 | Reneau | 285/315 X |
| 4,153,278 | 5/1979 | Ahlstone | 285/315 X |
| 4,188,050 | 2/1980 | Lochte | 285/315 X |
| 4,225,160 | 9/1980 | Ortloff | 285/137 |
| 4,270,398 | 6/1980 | Arnold | 74/110 |
| 4,290,483 | 2/1980 | Lawson | 285/315 X |
| 4,337,971 | 7/1982 | Kendrick | 285/320 |

*Primary Examiner*—Wayne L. Shedd
*Attorney, Agent, or Firm*—Roylance, Abrams, Berdo & Goodman

[57] ABSTRACT

In connectors, particularly for underwater well installations, for securing two members together under large clamping forces, an annular locking means is actuated by means including cam surfaces which coact through rolling antifriction members, the actuating means being so constructed and arranged as to reduce the lengths of the cam surfaces and better retain the antifriction elements.

13 Claims, 10 Drawing Figures

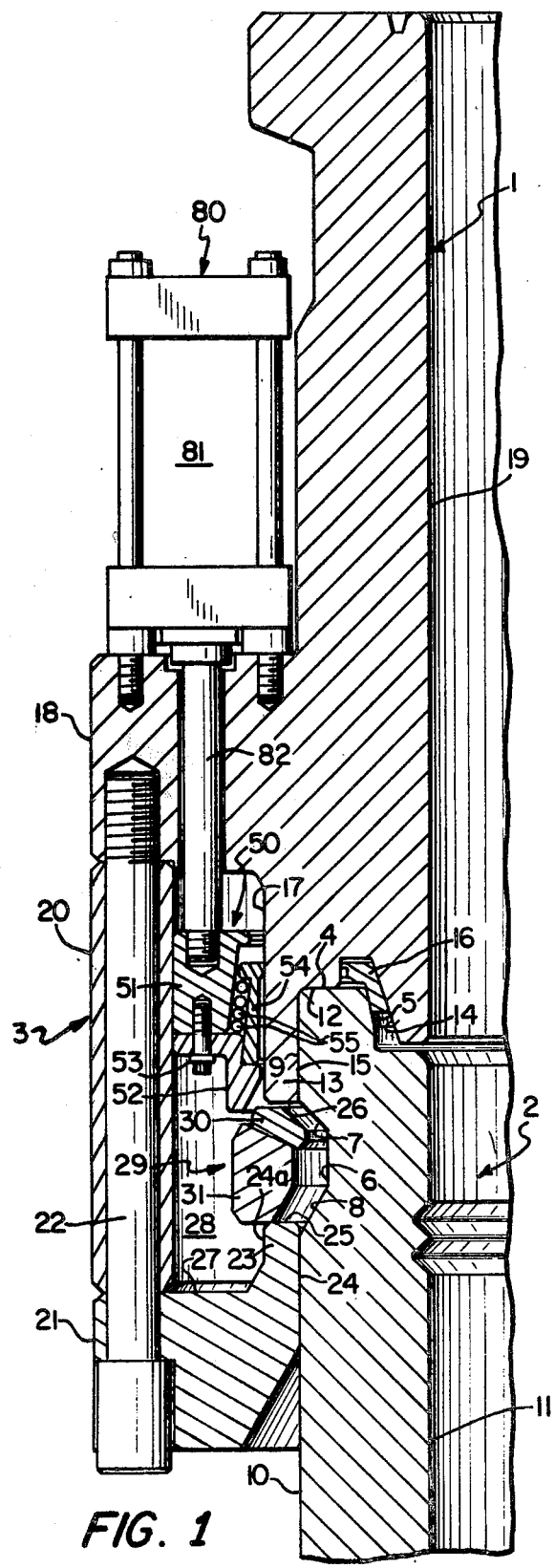
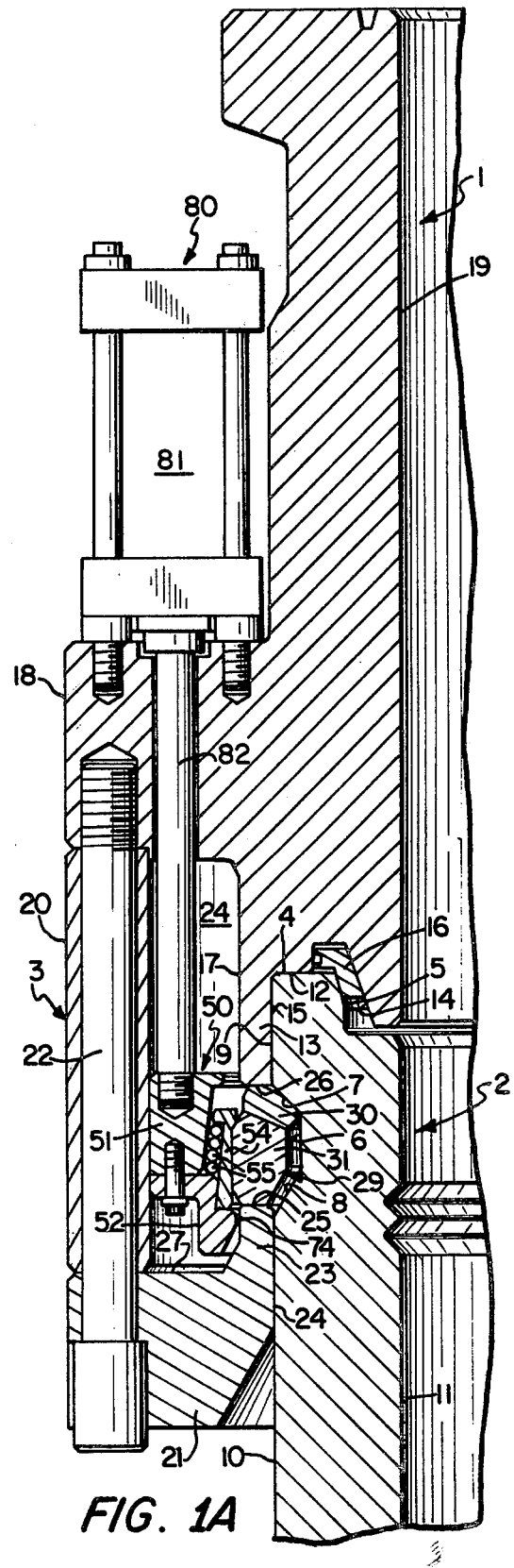
FIG. 1
FIG. 1A

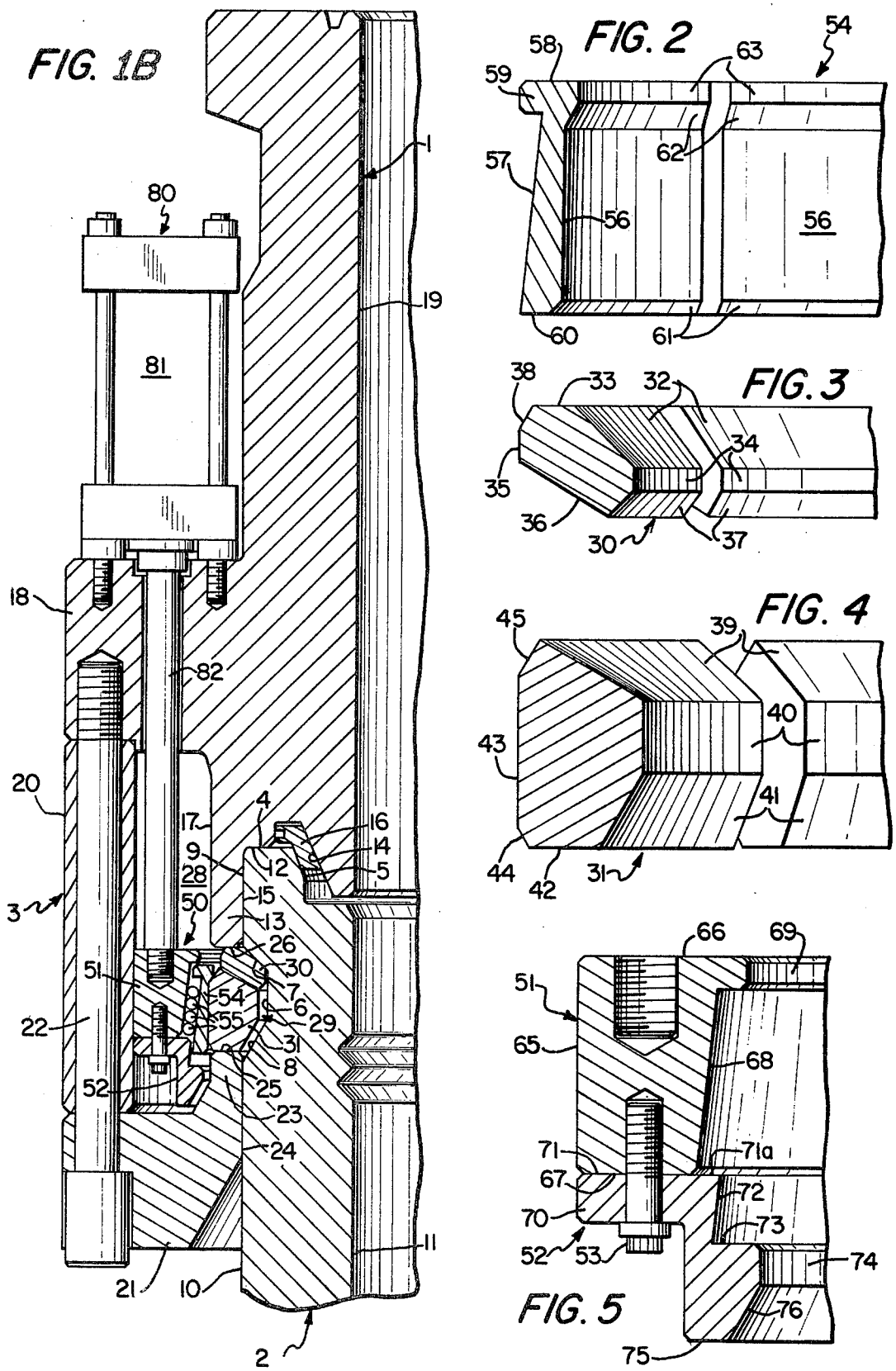

CONNECTORS FOR SECURING MEMBERS TOGETHER UNDER LARGE CLAMPING FORCE

This invention relates to connectors capable of providing large clamping forces and is particularly applicable to remotely operated connectors for use in underwater well installations.

RELATED APPLICATIONS

Subject matter disclosed herein is also disclosed and claimed in copending applications Ser. No. 327,449, filed concurrently herewith by James H. Owen, III, and Ser. No. 327,446, filed concurrently herewith by Edward M. Galle, Jr.

BACKGROUND OF THE INVENTION

The need for developing large clamping forces in connectors for securing two members together has long been recognized. Providing large clamping forces is especially important when the connector is to be used for connecting two tubular members of an underwater well installation, since the connection must then withstand not only large forces resulting from component weight and the actions of waves and currents but also large internal fluid pressures. All of the successful prior-art connectors employed in the underwater well field for developing high clamping forces appear to employ annular locking means, varying from annularly arranged collets or segments to a single split locking ring, the locking means being carried by one of the members to be connected and having a frustoconical locking shoulder to engage with a mating shoulder carried by the other member. Opposed transverse end surfaces are provided, and the effect of the locking means, when actuated, is to clamp the end faces together, the locking shoulders providing a strong wedging action to generate the clamping force. In such connectors, actuation of the locking means is accomplished by a rectilinear power device which acts in a direction generally axially of the connector. To convert the action of the power device into effective movement of the locking means, it has become a standard practice to have the power device force a driving ring axially relative to the connector, the driving ring having a frustoconical camming face which slidably engages the locking means to force the locking means generally radially and thus cause the desired wedging action at the locking shoulder.

A particular problem posed by the need for very large clamping forces in such connectors arises because, on the one hand, the power available from acceptable power devices is limited by size constraints while, on the other hand, losses due to friction at the camming surfaces demand large actuating power if operation of the locking means is to result in the desired large clamping forces. Accordingly, as disclosed in aforementioned application Ser. No. 327,449, such connectors have been improved by providing rolling antifriction elements between the camming surface of the driving ring and a cam follower surface on the locking means. While this improvement makes it possible to achieve marked increases in efficiency and therefore employ smaller power devices, a problem is presented because of the axial length of the camming surface driven by the power device and the difficulty of adequately confining the antifriction elements without introducing sliding friction.

OBJECTS OF THE INVENTION

It is accordingly a general object of the invention to provide a connector of the type described which capitalizes upon the advantages of having rolling antifriction elements between the camming surface of the driving ring but requires only a relatively short axial travel of the driving ring relative to the locking means.

Another object is to devise such a connector in which the rolling antifriction elements are confined to a desired operative location in a simple and effective manner.

A further object is to provide such a connector employing rolling antifriction elements which are effective to minimize sliding friction during establishment of a high preload but without requiring that the size of the connector be greatly increased.

SUMMARY OF THE INVENTION

Connectors according to the invention comprise a first connector member to be joined to one of the members to be connected, a second connector member to be joined to the other member to be connected, annular locking means which can be radially distorted between an inactive position and an active position, a resilient metal split ring having two opposed annular faces one of which is adapted for telescopic engagement with the locking means and the other of which is frustoconical and tapers axially of the connector to constitute a cam follower surface, a driving ring having a frustoconical camming surface which tapers at the same angle and in the same direction as the cam follower surface, and a plurality of rolling antifriction elements disposed between and in rolling engagement with the camming surface of the driving ring and the cam follower surface of the split ring, the arrangement being such that the split ring and the driving ring can be moved axially of the connector between first positions, in which the locking means is free to assume its inactive position, and second positions. When both the driving ring and the split ring occupy their second positions, the locking means is distorted radially to its fully active position, establishing the desired preload on the connector. The axial travel necessary to bring the split ring to its second position is less than is required to bring the driving ring to its second position. As the actuating movement progresses from the first positions of the two rings, the locking means is distorted preliminarily toward its active position as a result of a simple cam-surface-to-cam surface action, and the split ring finishes its travel in a position in which the split ring is in direct telescopic engagement with the locking means. This preliminary action causes the locking means to be engaged preliminarily, but with the action of the locking means being short of that required to accomplish the necessary preload. The final stage of movement of the driving ring then occurs while the split ring is restrained against further axial movement, so that the driving ring, the rolling antifriction elements and the split ring then coact to further distort the locking means and establish the preload. The combination of the locking means, split ring and driving ring is carried by one of the two connector members, typically by the female member, and the locking means is of the type presenting a frustoconical locking shoulder disposed to coact with a mating shoulder carried by the other connector member.

IDENTIFICATION OF THE DRAWINGS

Particularly advantageous embodiments of the invention will be described in detail with reference to the accompanying drawings, wherein:

FIGS. 1–1B are fragmentary vertical sectional views of a connector according to one embodiment of the invention, showing successive stages of operation of the connector;

FIG. 2 is an enlarged view, partly in radial cross section and partly in side elevation, of a split ring forming part of the connector of FIGS. 1–1B;

FIG. 3 is a view similar to FIG. 2 of a first split ring forming part of the locking means of the connector;

FIG. 4 is a view similar to FIG. 3 of a second split ring employed in the locking means of the connector;

FIG. 5 is a view similar to FIG. 2 of a driving ring forming part of the connector;

DETAILED DESCRIPTION OF THE INVENTION

The Embodiment of FIGS. 1–5

Figure 6:
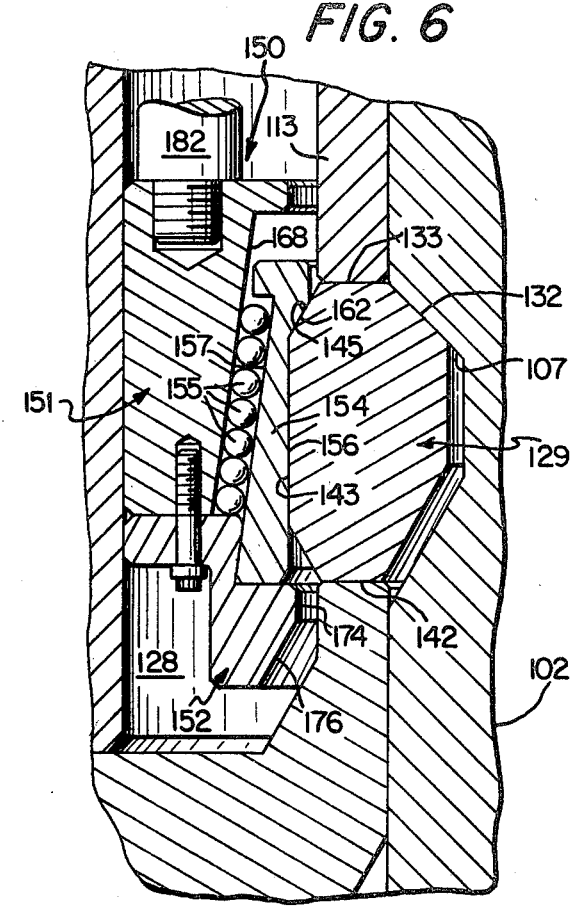
FIG. 6 is a fragmentary vertical sectional view, enlarged relative to FIGS. 1–1B, illustrating the invention with a locking means comprising only one split ring.

FIGS. 1–5 illustrate one embodiment of the invention and one typical application. Here, the members to be connected are the wellhead upper body 1 and wellhead lower body 2 of an underwater well installation. In this embodiment, upper body 1 and the associated connector body indicated generally at 3 constitute the female connector member. The lower body 2 constitutes the male connector member. As well understood in the art, connections of this general type are made up by first installing lower body 2 with the aid of a conventional guidance system (not shown), body 2 being rigidly secured to, e.g., the conductor casing of the well, and then lowering body 1 into place, again with the aid of the guidance system, such operations now usually being accomplished without diver assistance.

Body 2 has a flat transverse annular upwardly directed end face 4 and a frustoconical seal surface 5 which tapers downwardly and inwardly from end face 4. In a location significantly below end face 4, the body has a transverse annular outwardly opening locking groove defined by a right cylindrical inner wall 6, a frustoconical upper wall 7 which tapers downwardly and inwardly, and a frustoconical lower wall 8 which tapers upwardly and inwardly. The outer surface of body 2 is right cylindrical and includes a portion 9 extending from the locking groove to end face 4 and a portion 10 which extends downwardly from the locking groove. Body 2 is provided with axial through bore 11.

Body 1 has a transverse annular downwardly directed end face 12, a dependent tubular skirt 13 at the outer periphery of face 12, and a frustonical seal surface 14 which tapers downwardly and inwardly at a slightly smaller angle than does surface 5. When body 1 is seated on body 2, end face 12 is in flush engagement with end face 4, the right cylindrical inner surface 15 of skirt 13 slidably embraces outer surface portion 9 of body 2, and seal surface 14 is concentric with and spaced inwardly from surface 5. Carried by member 1, a Laurent-type metal sealing ring 16 is engaged between surfaces 5 and 14. The right cylindrical outer surface 17 of skirt 13 is extended upwardly to terminate at the lower face of a transverse annular outwardly projecting flange 18. Body 1 has an axial through bore 19 coaxial with bore 11 when body 1 has been seated on body 2.

Connector body 3 comprises flange 18, a cylindrical outer wall member 20 and an annular lower member 21, members 20 and 21 being rigidly secured to flange 18, as by screws 22, in such fashion that member 20 depends from the flange and member 21 closes the space between the lower end of member 20 and the outer surface portion 10 of body 2. At its inner periphery, member 21 includes an upstanding cylindrical portion 23 having a right cylindrical inner surface 24, which slidably engages surface portion 10 when body 1 has been landed on body 2, and a right cylindrical outer surface portion 24a. Portion 23 and skirt 13 are of the same radial width and present transverse annular end faces 25 and 26, respectively, which are mutually opposed, as best seen in FIG. 1. Portion 23 is of substantial height so that its end face 25 is located a substantial distance above the upper surface 27 of member 21. Body 3 thus defines a substantial annular space 28 which, when body 1 has been successfully landed on body 2, surrounds the upper portion of body 2, with the space between end faces 25,26 being opposed to the locking groove of body 2.

Accommodated by the space between end faces 25,26 is an annular locking means indicated generally at 29 and comprising an upper split locking ring 30 and a lower split ring 31. Seen in detail in FIG. 3, ring 30 has a frustoconical upper surface 32 which tapers downwardly and inwardly at the same angle as does upper wall 7 of the locking groove of body 2 and constitutes the locking shoulder of the locking means. At its upper edge, surface 32 joins a flat transverse annular upper surface 33. An axially short right cylindrical inner surface 34 joins the lower edge of surface 32, surface 34 being concentric with an axially short right cylindrical outer surface 35. The bottom of ring 30 is defined by a frustoconical surface 36 which tapers downwardly and inwardly at a smaller angle than does surface 32. The outer edge of surface 36 joins surface 35 while the inner edge of surface 36 joins a frustoconical surface 37 which tapers upwardly and inwardly to join inner surface 34. Surfaces 33 and 35 are connected by an upwardly and inwardly tapering frustoconical surface 38.

Ring 31 is substantially more massive than is ring 30 and, as seen in FIG. 4 is defined by an upper frustoconical surface 39, a right cylindrical inner surface 40, an upwardly and inwardly tapering inner surface 41, a flat transverse annular bottom surface 42, a right cylindrical outer surface 43 of considerable axial length, a downwardly and inwardly tapering frustoconical surface 44 interconnecting surfaces 42 and 43, and an upwardly and inwardly tapering frustoconical surface 45 interconnecting surfaces 39 and 43. Upper surface 39 tapers downwardly and inwardly at the same angle as does bottom surface 36 of ring 30 and is of slightly greater radial width than is surface 36. When locking means 29 is in place relative to connector body 3 and the rings 30–31 are in their relaxed and undistorted condition, seen in FIG. 1, bottom surface 42 of ring 31 overlaps and is in sliding engagement with upper end face 25 of portion 23 of member 21, the relaxed diameter of the ring being such that inner surface 40 lies slightly outside the cylindrical plane occupied by inner surfaces 15 and 24. Upper ring 30 rests with its bottom surface 36 in slidable engagement with surface 39 of ring 31, the relaxed and undistorted diameter of the upper ring being such that the upper ring is displaced inwardly relative to the lower ring. The axial dimensions of ring 30 are such that when both rings are in place but in their relaxed positions, as seen in FIG. 1, there is significant space between upper surface 33 of ring 30 and downwardly directed endface 26 of skirt 13. Though lower ring 31 does not project inwardly beyond surfaces 145, 24, when the ring is relaxed, upper ring 30 does project significantly beyond those surfaces. Because of this dimensional relationship, surface 37 of the upper ring is provided to engage the corner at the outer periphery of end face 4 of body 2 as body 1 is landed, such engagement causing ring 30 to be distorted outwardly so that surface 34 of the ring can pass over outer surface portion 9 of body 2, ring 30 contracting to its relaxed condition when the ring reaches the locking groove of body 2. Similarly, if it is necessary to recover body 1 when the locking means is in the inactive position seen in FIG. 1, applying an upward strain on body 1, as by a handling string, causes surface 32 of the upper ring to engage surface 7 of body 2, the upper ring then being cammed outwardly by coaction of surfaces 7 and 32 to allow the upper ring to pass over surface portion 9.

Actuation of the locking means from the inactive position seen in FIG. 1 to the fully actuated position seen in FIG. 1B is accomplished by an actuating unit indicated generally at 50, FIGS. 1–1B. Unit 50 includes a rigid driving ring comprising a main body 51 and an end ring 52 rigidly secured to the lower end of body 51, as by screws 53. Unit 50 further includes an inner split ring 54 and a plurality of rolling antifriction elements 55. Shown in detail in FIG. 2, split ring 54 has a major inner surface 56 which is right cylindrical and a major outer surface 57 which is frustoconical and tapers upwardly and inwardly at a small angle, typically from several degrees to 15°. At its upper end, ring 54 presents a flat end face 58 which extends outwardly to constitute the upper surface of a transverse annular flange 59 which projects outwardly from the upper end portion of surface 57. At its lower end, ring 54 has a flat transverse annular end face 60, the outer periphery of face 60 joining outer surface 57, the inner periphery of face 60 being joined to inner surface 56 by an upwardly and inwardly tapering frustoconical shoulder 61. Inner surface 56 terminates short of the upper end of the ring, joining a frustoconical stop surface 62 which tapers upwardly and inwardly at the same angle as surface 45 of ring 31 and surface 38 of ring 30. A right cylindrical inner surface portion 63 joins the upper edge of stop surface 62 and the inner periphery of upper end face 58.

Main body 51 of the driving ring is complete, unsplit and has a right cylindrical outer surface 65, FIG. 5, of a diameter to be slidably embraced by the inner surface of wall member 20, a transverse annular top face 66, a transverse annular bottom face 67, and a frustoconical inner surface 68 which tapers upwardly and inwardly at the same angle as does outer surface 57 of split ring 54. Top face 66 is continued inwardly beyond inner surface 68 to constitute the upper surface of a transverse annular flange 69. End ring 52 is also a complete rigid ring and includes a transverse annular outwardly projecting flange portion 70 having a flat upper surface 71 in flush engagement with end face 67 of body 51 and accommodates screws 53, as shown. Surface 71 projects inwardly beyond the lower end of surface 68 to provide an upwardly directed shoulder 71a directed toward flange 69. The main body of the end ring depends from the inner portion of flange portion 70, being defined by an upper inner surface portion 72 which is frustoconical and tapers upwardly and inwardly at the same angle as surfaces 57 and 68, an upwardly directed transverse annular shoulder 73 which extends inwardly from surface 72 and has a radial width slightly greater than lower end face 60 of split ring 54, a right cylindrical inner surface portion 74, a transverse annular bottom face 75, and a frustoconical surface portion 76 which joins the inner edge of face 75 and the lower end of surface portion 74. The combined axial length of surfaces 68 and 72 is substantially greater than the axial length of surface 57 of split ring 54. The diameter of surface 74 is significantly smaller than that of surface 56.

As will be clear from FIGS. 1 and 1A, the lower end portion of ring 54 is initially seated on shoulder 73 of end ring 52 of the driving ring. The relaxed outer diameter of the lower end portion of ring 54 is such that, when end face 60 of ring 54 is seated on shoulder 73, the lower portion of surface 57 of the split ring is immediately adjacent to or engaged with surface 72 of end ring 52. In this embodiment, antifriction elements 55 are identical spherical balls, the diameter of the balls being slightly greater than the space between surfaces 57 and 68 so that, with ring 54 in place, balls 55 are positively engaged between body 51 of the driving ring and the main body of the split ring and are therefore maintained in constant rolling engagements with both surfaces 57 and 68.

Considering FIGS. 1–1B, it will be apparent that, with the driving ring being free to move downwardly past split ring 54 through a distance determined by the space between flanges 59 and 69, surface 57 of the split ring constitutes a cam follower surface and surface 68 of the driving ring constitutes a camming surface.

In this embodiment, actuating unit 50 is driven by a plurality of rectilinear motors 80, FIGS. 1–1B, rigidly mounted on flange 18 and equally spaced about the circle of the flange. Typically, motors 80 are conventional hydraulic motors each comprising a cylinder 81 and a piston rod 82, the piston rods projecting downwardly through bores in flange 18 and having their threaded lower ends engaged in threaded blind bores in body 51 of the driving ring. Motors 80 are all operated simultaneously, as from a single source of fluid under pressure, to move the driving ring donwardly from a first, elevated position (FIG. 1) to a fully actuated second, lower position (FIG. 1B) and, when energized in the opposite mode, to return the driving ring to its first position. When the driving ring is in its first position, both the driving ring and split ring 54 are spaced above and out of contact with locking means 29, so that split rings 30,31 of the locking means are allowed to assume their fully relaxed inactive positions, seen in FIG. 1. With actuating unit 50 thus fully retracted upwardly, surface 63 of ring 54 and surface 74 of end ring 52 can be in light sliding engagement with surface 17 or spaced slightly outwardly therefrom and split ring 54 occupies its lowermost position relative to the driving ring, with lower end face 60 of the split ring seated on shoulder 73 of end ring 52. As actuating unit 50 is forced downwardly by motors 80, frustoconical surface 76 of end ring 52 comes into engagement successively with surface 38 of ring 30 and surface 45 of ring 31 and cams those rings inwardly, with inner surface 74 of end ring 52 then slidably traversing outer surface 43 of ring 31.

When shoulder 73 of the end ring passes downwardly beyond ring 31, ring 31 springs outwardly slightly and split ring 54 then directly embraces surface 43, stop surface 62 of split ring 54 now being in engagement with surface 45 of ring 31 and thereby preventing further downward movement of split ring 54, as will be apparent from FIG. 1A. Since, at this stage, lower end face 75 of end ring 52 is still spaced substantially above upper face 27 of member 21, and flange 69 of the driving ring is spaced substantially above upper end face 58 of ring 54, the driving ring is still free for downward movement, though split ring 54 is fixed against such movement. Accordingly, continued operation of motors 80 forces the driving ring downwardly past ring 54 to the position seen in FIG. 1B. Such additional downward movement of the driving ring relative to split ring 54 causes the driving ring to cam the combination of rings 54, 31 and 30 inwardly to the positions seen in FIG. 1B.

Though progression from the first positions of the driving ring and split ring 54, seen in FIG. 1, to the second position of split ring 54, seen in FIG. 1A, results in a major deflection of the locking means radially inwardly, and that deflection is caused by direct coaction between surface 76 of the driving ring and surfaces 38 and 45, without any camming action from surfaces 57 and 68 through balls 55, such deflection of the locking means is only preliminary, bringing locking shoulder 32 of the locking means into initial flush engagement with the mating shoulder constituted by upper wall 7 of the locking groove on body 2. Accordingly, the losses due to sliding friction are comparatively small. It is the next stage of actuation of the locking means, requiring that shoulder 32 be so forcibly wedged beneath upper wall 7 as to establish the desired high preload at interengaged surfaces 4,12 and at the metal sealing ring 16, which would result in unacceptable losses due to sliding friction if conventional actuation were accomplished through cam surfaces in direct sliding engagement. According to the invention, this next stage of actuation is accomplished by forcing only the driving ring downwardly, from the FIG. 1A position to the FIG. 1B position, while split ring 54 remains fixed against further downward movement. Since downward movement of body 51 relative to ring 54 causes camming surface 68 to move, in effect, radially closer to cam follower surface 57, and since balls 55, body 51 and ring 54 are essentially incompressible, the effect is to distort ring 54 radially inwardly, with ring 54 forcing rings 30,31 radially inwardly. Though such radial movement is small, the resulting wedging action between surfaces 32 and 7 is very strong, particularly when surfaces 32 and 7 taper at the optimum angle of 45°. Actuation in this fashion is highly efficient, so that recourse need not be had to excessively large motors, both because of the very high mechanical advantage afforded by the small angle of taper of camming surface 68 and cam follower surface 57 and because of the essential lack of sliding friction between rings 51 and 57 at this stage of the actuation. A further increase in efficiency is achieved in this embodiment because of the relatively small angle of taper of interengaged surfaces 36 and 39. In this connection, it will be observed that, during actuation from the FIG. 1A position to the FIG. 1B position, some movement of ring 30 radially inwardly is first achieved, followed by continued movement of ring 31 radially inwardly, with this last movement resulting mainly in sliding movement of surface 39 under surface 36 rather than of surface 32 under surface 7, so that the main sliding friction involved is at surfaces of smaller inclination.

The Embodiment of FIG. 6

In this embodiment, locking means 129 is a single split ring which presents a locking shoulder 132 to coact with the upper wall 107 of the locking groove of lower body 102. The single split ring also has a transverse annular upper face 133, a transverse annular lower face 142, and a major right cylindrical outer surface 143, surfaces 143 and 133 being joined by an upwardly and inwardly tapering frustoconical stop surface 145. Actuating unit 150 is essentially the same as unit 50 of the embodiment shown in FIGS. 1–5. Thus, the unit includes split ring 154 which has a right cylindrical inner surface 156 to embrace surface 143 of the locking ring, and frustoconical stop surface 162 to engage surface 145 of the locking ring and thus determine the second position for split ring 154. Ring 154 again presents an upwardly and inwardly tapering frustoconical outer surface 157, to serve as the cam follower surface. The end ring 152 of the driving ring includes upwardly and inwardly tapering surface 176 disposed to come into engagement with surface 145 of the locking ring and distort the locking ring inwardly during the first stage of actuation, and cylindrical surface 194, of a diameter slightly smaller than surface 156. Main body 151 of the driving ring includes frustoconical inner surface 168 which tapers upwardly and inwardly at the same angle as does surface 157 so that surface 168 constitutes the camming surface. Antifriction elements 155 are again disposed between ring 154 and body 151 so as to be in constant rolling engagement with both surfaces 157 and 168. Structure not shown in FIG. 6 is as illustrated in FIGS. 1–1B. Save that the single locking ring moves as a unit first in response to coaction of surfaces 145 and 176, then in response to the camming action of surfaces 157 and 168 via antifriction elements 155, operation of the connector illustrated in FIG. 6 is the same as described with reference to FIGS. 1–1B.

Figure 7:
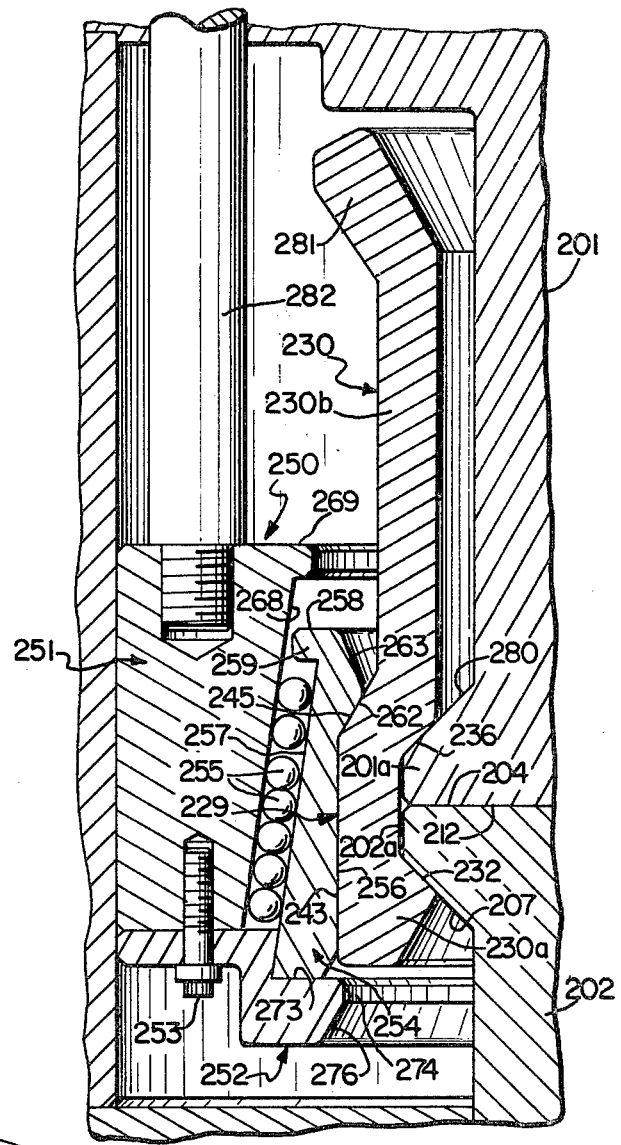
FIG. 7 is a view similar to FIG. 6 but illustrating the invention with another form of locking means.

The Embodiment of FIG. 7

Here, locking means 229 comprises an annular series of locking dogs 230 which coact with outwardly projecting transverse annular end flanges 201a and 202a on bodies 201 and 202, respectively, in the manner described in U.S. Pat. No. 3,096,999, issued July 9, 1963, to Ahlstone et al. End flanges 201a, 202a are complementary and present opposing end faces 204 and 212, respectively, which are in face-to-face engagement under the high clamping force applied by the connector. Flange 201a includes an upwardly and inwardly tapering frustoconical upper surface 280. Flange 202a has a downwardly and inwardly tapering frustoconical surface 207. Flange surfaces 207 and 280 both constitute locking shoulders, as later described.

Locking dogs 230 are elongated segments of arcuate transverse cross section and include a locking portion, indicated generally at 230a, and a retracting portion, indicated generally at 230b. Portions 230a are of generally C-shaped longitudinal cross section and present two locking shoulders, upper shoulder 236 lying in a frustoconical plane which tapers upwardly and inwardly at the same angle as surface 280, lower shoulder 232 lying in a frustoconical plane which tapers downwardly and inwardly at the same angle as surface 207 of flange 202a. Portions 230a also include an outer surface portion 243 which is right cylindrical and, at the upper end of surface portion 243, an upwardly and inwardly tapering frustoconical surface portion 245. Retracting portions 203b comprise axially elongated portions defined by right cylindrical inner and outer surfaces, and angularly offset end portions 281 defined by inner and outer frustoconical portions which taper downwardly and inwardly.

Actuating unit 250 again comprises a rigid driving ring comprising main body 251 and an end ring 252 secured to the lower end of body 251, as by screws 253, and a split ring 254. The inner face of split ring 254 includes a right cylindrical surface portion 256, a frustoconical outer surface portion 257 which tapers upwardly and inwardly at a small angle, outwardly projecting upper end flange 259, an upper end face 258 and a downwardly and inwardly tapering frustoconical surface portion 263 which joins face 258 and an upwardly and inwardly tapering frustoconical stop surface 262. Surface portion 263 tapers at approximately the same angle as does the outer surface of end portion 281. Stop surface 262 tapers at the same angle as does surface portion 245. Surface 256 is dimensioned to embrace outer surfaces 243 of the locking dogs.

Body 251 is identical to body 51, FIGS. 1-1B, and includes a frustoconical camming surface 268 which tapers upwardly and inwardly at the same angle as cam follower surface 257, the upper portion of the camming surface terminating at inwardly projecting flange 269. Identical to ring 252 of FIGS. 1-1B, end ring 252 includes upwardly facing shoulder 273, upon which split ring 254 seats, downwardly directed frustoconical surface 276, which tapers upwardly and inwardly at an angle suitable for camming engagement with surfaces 245 of the locking dogs as the actuating unit is moved downwardly from its first position toward its lowermost position, and cylindrical surface 274. Actuating unit 250 is again driven by a plurality of rectilinear power devices the driving rods 282 of which are connected directly to body 251.

As in the embodiments previously described, a plurality of rolling antifriction elements 255 are disposed in the space between surfaces 257 and 268, with the antifriction elements held in constant rolling engagement with both the camming surface and the cam follower surface.

In operation, upward movement of actuating unit 250 to its uppermost position (as seen in FIG. 1) causes surface 263 to engage the outer surfaces of end portions 281 of all of the locking dogs, simultaneously pivoting the dogs about fulcrums established by engagement of the upper edges of surfaces 236 of the dogs with upwardly directed shoulder 280 of end flange 201a. As the actuating unit reaches its uppermost position, such pivotal motion of the locking dogs swings portions 230a out of engagement with flange 202a of the lower body 202, so that upper body 201 is free to be withdrawn upwardly. When upper body 201 has been properly landed on body 202, downward movement of the actuating unit from its uppermost position to the position of split ring 254 seen in FIG. 7 causes surface 276 of end ring 252 to engage shoulders 245 of the locking dogs (which are outwardly displaced at this stage of operation), causing all of the locking dogs to be pivoted to the positions seen in FIG. 7, with locking surfaces 232,236 of the dogs then engaging locking surfaces 207 and 280, respectively, of end flanges 202a and 201a. End ring 252 then passes downwardly over surfaces 243, and the inner surface 256 of split ring 254 embraces surfaces 243 and stop surface 262 of the split ring engages shoulders 245 of the locking dogs and split ring 254 is thus stopped in its second position. At this stage, portions 230a of the locking dogs have been actuated inwardly from their outer, inactive positions (to which they were initially biased by engagement of surface 263 with end portions 281) to inner positions of initial engagement with end flanges 201a and 202a, but such engagement is preliminary and does not generate the high clamping force necessary to establish an adequate preload at engaged surfaces 204,212. To complete making up of the connection, driving rods 282 are moved downwardly to force ring 251 and its camming surface 268 downwardly relative to split ring 254, in the manner hereinbefore described with reference to FIG. 1B. Hence, camming surface 268, balls 255 and cam follower surface 257 coact to distort split ring 254 inwardly and therefore force portions 230a of the locking dogs inwardly, causing a strong wedging action between surfaces 207 and 232 and between surfaces 280 and 236, so that the desired large clamping force and preload are established.

Figure 8:
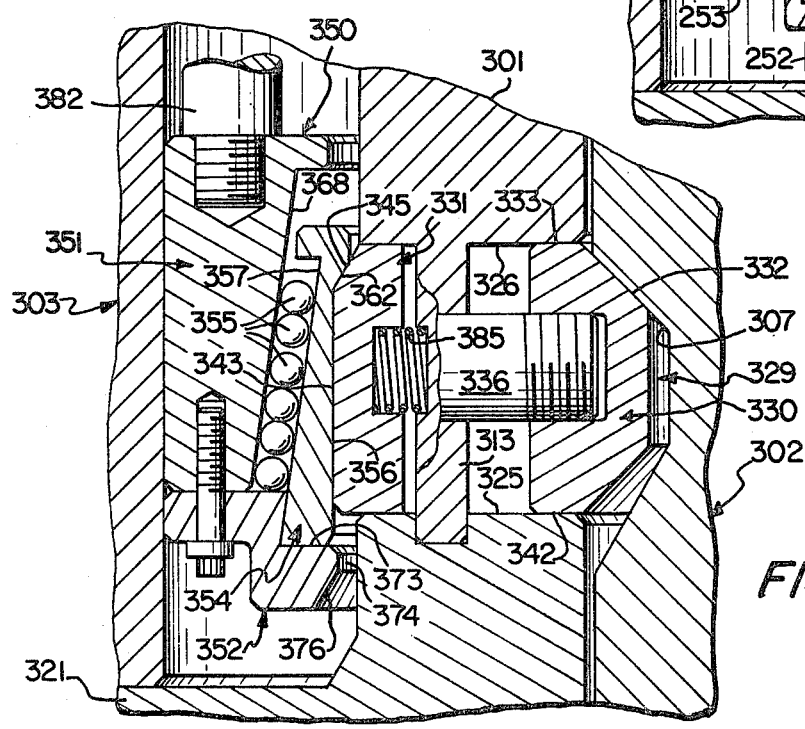
FIG. 8 is a view similar to FIG. 6 but illustrating the invention with yet another form of locking means.

The Embodiment of FIG. 8

In this embodiment, the annular locking means 329 comprises an annular series of arcuate segment units carried by the connector body 303 secured to upper body 301, the segment units being operative to coact with an outwardly opening locking groove presented by body 302. The segment units are identical, each including an arcuate segment body 330 and an arcuate follower body 331 rigidly interconnected by a short cylindrical shaft 336. Upper body 301 includes a right cylindrical dependent skirt 313 provided with a plurality of radial apertures each slidably accommodating a different one of the shafts 336. For each unit, shaft 336 is centered with respect to the segment and follower body, and two helical compression springs 385, located each on a different side of shaft 336, are interposed between the follower body and skirt 313 to bias the segment outwardly to an inactive position which allows upper body 301 to be moved telescopically relative to body 302.

Each body 330 has a downwardly and inwardly tapering frustoconical shoulder 332 which tapers at the same angle as does the upper wall 307 of the locking groove presented by body 302. The flat transverse annular upper face 333 slidably engages a transverse annular downwardly directed shoulder 326 on body 301. The transverse annular lower face 342 of body 330 is in slidable engagement with a shoulder 325 presented by lower member 321 of the connector body 303. Each follower body 331 includes a right cylindrical outer surface portion 343 and, at the upper edge of that surface portion, an upwardly and inwardly tapering frustoconical surface 345. Shoulders 325 and 326 extend outwardly beyond skirt 313 and the follower body is slidably engaged between those shoulders.

Actuating unit 350 is identical with unit 50 of the embodiment illustrated in FIGS. 1-1B and includes a split ring 354, which has outer cam follower surface 357, inner cylindrical surface 356 and inner stop surface 362. The actuating unit also includes a driving ring comprising rigid annular body 351 and rigid end ring 352, body 351 presenting the inner camming surface 368, end ring 352 presenting shoulders 373 and 376 and cylindrical surface 374. The actuating unit is again driven by a plurality of rectilinear power devices (not shown in FIG. 8), typically the hydraulic motors 80, FIGS. 1–1B, having driving rods 382, and the power devices are operative to move the actuating unit from an initial position (as that seen in FIG. 1) downwardly to the position seen in FIG. 8, with split ring 354 now stopped in its second position, and to then move the driving ring to its second position (as that seen in FIG. 1B). Such movement of the actuating unit is effective first to move the segment units radially inwardly, against the biasing action of springs 385, to achieve the preliminary position seen in FIG. 8, and then, through camming coaction of cam follower surface 357, camming surface 368 and rolling antifriction elements 355, to accomplish a small further radial movement of the segment units inwardly to cause a strong wedging action at shoulders 307,332 and thereby establish the desired large clamping force and preload.

What is claimed is:

1. In a connector for connecting two members together under a large clamping force, the combination of
    a first connector member to be joined to one of the members to be connected;
    a second connector member to be joined to the other of the members to be connected;
    annular locking means carried by the first connector member and presenting a generally annular locking shoulder capable of flush engagement with a mating shoulder carried by the second connector member,
        the locking means being radially distortable between an inactive position, in which the locking means can be moved axially relative to the second connector member, and an active position, in which the locking shoulder is engaged with the mating shoulder,
        the locking means being yieldably biased toward its inactive position;
    a resilient metal split ring having an inner surface and an outer surface,
    one of the inner and outer surfaces of the split ring being shaped and dimensioned for telescopic engagement with the locking means,
    the other of the inner and outer surfaces of the split ring being frustoconical, tapering axially of the connector and constituting a cam follower surface;
    a rigid driving ring having a frustoconical camming surface tapering at the same angle and in the same direction as the cam follower surface of the split ring;
    the split ring and the driving ring being supported on the first connector body for movement axially of the connector between first positions, in which the locking means is allowed to occupy its inactive position, and second positions, in which, when both the split ring and the driving ring occupy their second positions, the locking shoulder of the locking means is in wedging engagement with the mating shoulder, the excursion of the driving ring from its first position to its second position being longer than the excursion of the split ring from its first position to its second position;
    a plurality of rigid rolling antifriction elements disposed between and in direct rolling engagement with the camming surface of the driving ring and the cam follower surface of the split ring; and
    retaining means carried by the split ring and the driving ring and disposed to prevent the antifriction elements from rolling axially beyond the confines of the opposed portions of the camming and cam follower surfaces.

2. The combination defined in claim 1, wherein the annular locking means comprises at least one resilient metal split ring.

3. The combination defined in claim 2, wherein the locking shoulder of the locking means is on an inner peripheral portion of a resilient metal split ring;
    the first-mentioned split ring is disposed to embrace the locking means and the cam follower surface is an outer surface; and
    the driving ring surrounds said first-mentioned split ring and the camming surface is an inner surface of the driving ring.

4. The combination defined in claim 1, wherein the annular locking means comprises a plurality of lock units spaced apart in a circular series, each of the lock units having
    a shoulder portion, the shoulder portions combining to constitute the locking shoulder of the locking means, and
    other portions, said other portions combining to present a generally annular surface to be engaged by the split ring.

5. The combination defined in claim 4, wherein the lock units are arcuate segments.

6. The combination defined in claim 4, wherein the lock units are individual locking dogs.

7. The combination defined in claim 1, wherein the retaining means comprises
    an annular flange carried by the split ring at one axial end of the cam follower surface and projecting toward the plane occupied by the camming surface, and
    an annular surface carried by the driving ring at the axial end of the camming surface opposite the annular flange, extending toward the plane occupied by the cam follower surface, and facing the annular flange.

8. The combination defined in claim 1, wherein the split ring includes
    a cylindrical surface slidably engageable with a cylindrical surface presented by the locking means, and
    a transverse annular stop surface disposed to engage a coacting stop surface on the locking means when the split ring has been moved into telescopic relation with the locking means; and
    the driving ring comprises
    a second frustoconical camming surface engageable with a mating cam follower surface on the locking means as the driving ring is moved from its first position toward its second position,
    the second camming surface and said mating cam follower surface being so dimensioned and located as to coact to distort the locking means in a direction to move the locking shoulder toward the mating shoulder as the driving ring is moved from its first position toward its second position.

9. The combination defined in claim 8, wherein the driving ring comprises
    a main body which presents the camming surface, and
    an end ring secured to the main body at the end thereof which leads when the driving ring is moved from its first position toward its second position, the end ring projecting radially beyond the camming surface, the second camming surface being presented by the end ring.

10. The combination defined in claim 9, wherein the retaining means comprises an annular flange carried by the split ring at the end of the split ring opposite the end ring of the driving ring, and a shoulder presented by the end ring of the driving ring and facing toward the annular flange of the split ring.

11. The combination defined in claim 10, wherein the end ring of the driving ring includes a second shoulder spaced radially beyond said first-mentioned shoulder; and the split ring includes a shoulder which faces toward and is engageable with the second shoulder of the end ring of the driving ring.

12. The combination defined in claim 1, wherein the driving ring has an end which leads as the driving ring is moved from its first position toward its second position, the driving ring further comprising a shoulder located at the end of the camming surface which is nearer the leading end of the driving ring; and the split ring has an end directed toward said shoulder, the dimensions of the split ring in its relaxed and undistorted condition being such that said end of the split ring can engage said shoulder.

13. The combination defined in claim 1, wherein the driving ring includes a second camming surface, the second camming surface being disposed in advance of the split ring, in the direction of movement of the camming ring from its first position toward its second position, and being dimensioned to engage the locking means and distort the locking means from its inactive position toward its active position as the driving ring advances toward its second position.

* * * * *